April 16, 1968  C. H. SNYDER, JR  3,378,225
VALVED FLUID-TIGHT COUPLING
Filed Oct. 14, 1965  2 Sheets-Sheet 1

INVENTOR.
CLIFFORD H. SNYDER, JR.
BY
HIS ATTORNEY

April 16, 1968  C. H. SNYDER, JR  3,378,225
VALVED FLUID-TIGHT COUPLING
Filed Oct. 14, 1965  2 Sheets-Sheet 2

INVENTOR.
CLIFFORD H. SNYDER, JR.
BY
HIS ATTORNEY

United States Patent Office 3,378,225
Patented Apr. 16, 1968

3,378,225
VALVED FLUID-TIGHT COUPLING
Clifford H. Snyder, Jr., 173 Rosemont Drive,
Coraopolis, Pa. 15108
Filed Oct. 14, 1965, Ser. No. 495,987
6 Claims. (Cl. 251—149.6)

ABSTRACT OF THE DISCLOSURE

A quick release, valved fluid-tight coupling is disclosed in which the coupling housing portion has a plurality of radially reciprocating locking balls which are forced inwardly by a sleeve to clamp about the nipple portion of the coupling. The housing portion of the coupling has a rigid cartridge member which provides recesses for the seal elements in the housing. The cartridge member may be easily removed from the housing and the type of seal utilized in the cartridge unit may be varied. The cartridge unit provides the seating surface for the valve within the housing of the coupling and retains the seal ring which serves to seal the valve against its seat as well as to seal the cartridge to the housing wall.

---

The present invention relates to a valved fluid-tight coupling, and more particularly to a valved coupling in which the housing is so formed that the seals within the coupling may be readily replaced and the seals are not exposed to washout upon high velocity flow through the coupling.

In the modern use of fluid couplings, the same coupling is often utilized for fluids of different types. Accordingly, seals that are effective for some fluids are not effective for others. The present invention is directed to a coupling in which the housing of the coupling is formed in three major parts so that the seals within the coupling are readily replaceable. In this manner, the type of seal within the coupling, such as a seal formed of a resilient material having a rapid rate of restoration after deformation (rubber or the like) or a seal having a relatively non-resilient characteristic and a slow rate of restoration after deformation (Teflon or the like), may be readily interchanged for the other type of seal while the coupling is in service in the field.

The construction of the coupling of the present invention makes the interchangeability of the seals possible without any special tooling of any kind and permits interchangeability of the seals in a matter of seconds. Further, the coupling of the present invention is so constructed that when the coupling is in the engaged position and flow is taking place therethrough the seals are not exposed to the velocity of flow through the coupling in a manner which could cause washout of the seals. Rather, the seals are protected from high velocity flow by the construction of the coupling.

Another feature of the coupling of the present invention is that the housing of the coupling contains a check valve which seats against the coupling when the nipple of the coupling is not in position within the housing. The seat of the check valve is so constructed that an effective seal is provided for the check valve and yet that seal is not subjected to high velocity washout upon flow of fluid through the coupling when the check valve is open.

With the foregoing considerations in mind, it is an object of the present invention to provide an improved valved fluid-tight coupling.

Another object of the present invention is to provide a fluid-tight coupling in which the housing is formed so that the seals within the coupling may be readily removed and replaced.

Another object of the present invention is to provide a valved fluid-tight coupling in which the seals within the coupling are not exposed to high velocity washout.

Another object of the present invention is to provide a valved fluid-tight coupling having a cartridge-like element which facilitates removal and replacement of the seals within the housing.

Another object of the present invention is to provide a valved fluid-tight coupling in which the seals that are utilized can be of either a resilient or non-resilient type and in which the seals can be interchanged from one type to the other.

These and other objects of the present invention will become apparent as this description proceeds in conjunction with the accompanying drawings.

Figure 1:
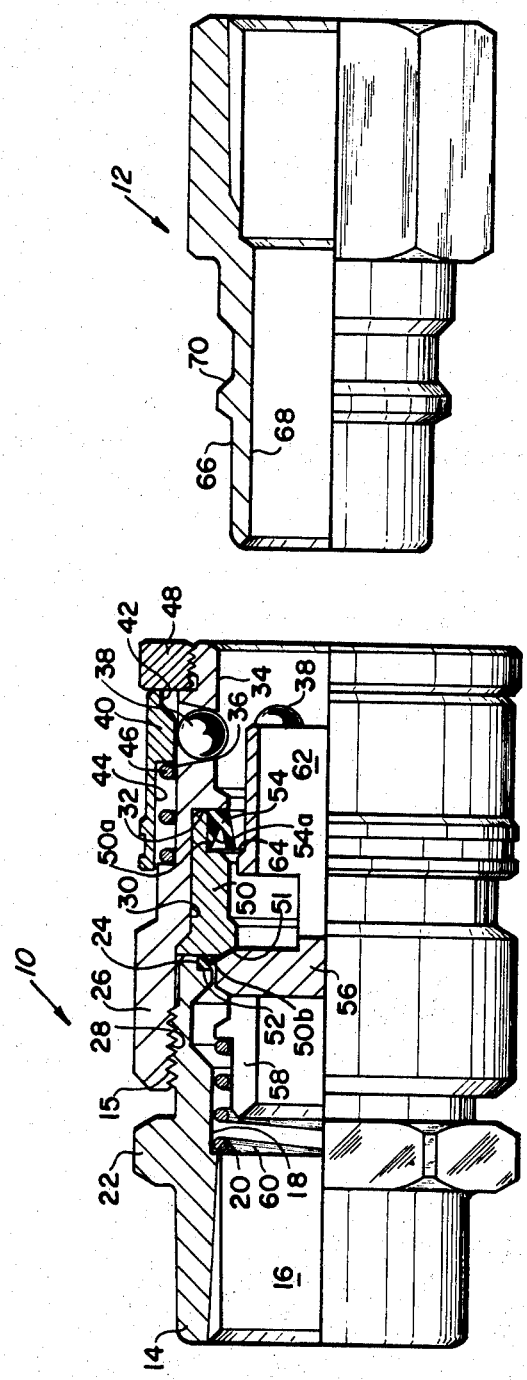
FIGURE 1 is an exploded view, in partial section, of the valved coupling of the present invention in the disengaged position.

Referring to the drawings, and particularly to FIGURE 1, the coupling shown in the disengaged position in FIGURE 1 is formed from a housing 10 and a nipple 12 which is received within the housing 10 to engage the coupling.

The housing 10 of the coupling has an externally threaded body 14 which is generally cylindrical in shape and which has the external threads 15 formed near one end thereof. The body 14 has a fluid flow passage 16 formed therethrough. Underlying the threaded area of the body 14 is a cylindrical internal surface 18 which joins to the flow passage 16 by an annular shoulder 32.

The body 14 has a polygonal surface 22 formed on a portion thereof to facilitate turning the body in assembly thereof. At the inner end of the body 14 is formed a seal ring receiving recess 24 into which a seal ring is disposed as will hereinafter be described.

An internally threaded barrel 26 having internal threads 28 formed thereon is threaded over the body 14 so that the external threads 15 of body 14 engage the internal threads 28 of barrel 26. The barrel 26 has a cylindrical internal surface 30 terminating in an annular shoulder 32.

The barrel 26 also has a locking surface 34 having a plurality of holes 36 positioned at regular intervals around the periphery of the locking surface 34. The holes 36 are of such size that a series of locking balls 38 may be received, one in each hole 36. The locking balls 38 fit partially through the holes 36 so that they protrude into the cylindrical area defined by locking surface 34. The locking balls 38 are large enough so that when they contact the nipple of the coupling, as will hereinafter be described, the nipple can swivel relative to the housing 10.

The locking balls 38 are retained within the respective holes 36 by a reciprocating sleeve 40 that overlies the external surface of barrel 26. An end groove 42 is formed on the sleeve 40. When the sleeve 40 is reciprocated to the point where end groove 42 overlies the locking balls 38, the locking balls 38 may be forced radially outwardly so that they no longer protrude into the surface defined by the locking surface 34.

A spring recess 44 is formed on the underside of reciprocating sleeve 40 and a helical spring 46 is positioned within the spring recess between the sleeve 40 and the barrel 26. The helical spring 46 urges the reciprocating sleeve 40 toward the right as viewed in FIGURES 1 and 2 to the position shown in those figures.

A retainer ring 48 is threaded onto the barrel 26 to keep the reciprocating sleeve 40 in position.

A cartridge 50 which is generally cylindrical in shape is clamped axially between the end of body 14 and the annular shoulder 32 of barrel 26 when the barrel 26 is threaded onto the body 14. The cartridge 50 has an annular seal ring receiving recess 50a formed on one end thereof so that the recess may receive a sealing ring as will be hereinafter described. At the other end, the cartridge 50 has an annular end wall which contacts the end of body 14 and serves to hold a seal ring within the seal ring receiving recess 24 of body 14 as will hereinafter be described. A conical valve seat 51 is formed on the cartridge 50 to provide a seat for the check valve of the coupling as will hereinafter be described.

Figure 3:
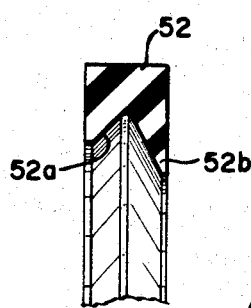
FIGURE 3 is a sectional view to an enlarged scale of one of the seal rings of the coupling of the present invention.

A first seal ring 52 is positioned within seal ring receiving recess 24 of body 14 and retained therein by cartridge 50. The first seal ring 52 is shown in detail in FIGURE 3. The seal ring 52 has a V-shaped groove 52a formed in the cylindrical internal surface thereof. The V-shaped groove is axially off center so that the V-shaped groove 52a forms a long leg 52b on the seal ring cross section. The seal ring 52 is so positioned within the recess 24 that the long leg 52b of seal ring 52 lies against the cartridge 50 and extends radially inwardly toward the axis of the coupling.

A second seal ring 54 is positioned within the seal ring receiving recess 50a of cartridge 50. The seal ring 54 is retained within the recess 50a by the annular shoulder 32 against which the cartridge 50 abuts when the housing 10 is assembled. The second seal ring 54 has a V-shaped groove 54a formed in one annular face thereof. The seal ring 54 is positioned within recess 50a so that the legs of the V extend axially way from shoulder 32 and toward the cartridge 50.

A check valve element 56 is positioned within the housing to reciprocate therein. As shown in FIGURE 1, the check valve 56 is seated against the valve seat 51 of the cartridge 50. When so seated, the check valve element 56 contacts the long leg 52b of first seal ring 52 and the seal ring provides a seal for the valve in the closed position.

A valve guide 58 is formed on the check valve 56 and extends axially away from the valve guide 58. A helical spring 60 surrounds the valve guide 58 and urges the check valve 56 to the seated position shown in FIGURE 1.

A nipple contacting sleeve 62 extends axially in the other direction from valve 56. The nipple contacting sleeve has a nipple shoulder 64 formed thereon so that the nipple contacts shoulder 64 when the coupling is engaged.

The nipple 12 is a generally cylindrical element having a cylindrical external surface 66 and a cylindrical internal surface 68. A retaining groove 70 is formed on the outer surface of the nipple to receive the locking balls 38 when the nipple is positioned within the housing. The conical surfaces forming the groove 70 are each 45° from the axis of the nipple 12 so that the balls 38 enter the groove and permit the nipple to swivel relative to the housing 10.

*Operation*

Figure 2:
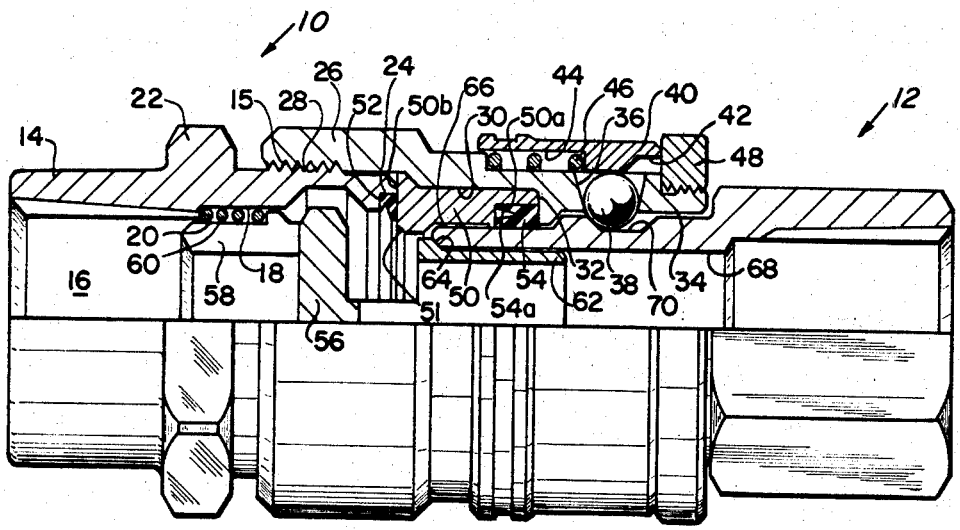
FIGURE 2 is a view, in partial section, of the coupling of FIGURE 1 in the engaged position.

In order to engage the coupling of FIGURES 1 and 2, the nipple 12 is inserted into the coupling so that cylindrical internal surface 68 of the nipple overlies the nipple contacting sleeve 62 of the check valve 56. The end of the nipple then contacts the nipple shoulder 64 and as the nipple 12 continues to be inserted into the housing 10, the check valve 56 is moved axially aginst the force of spring 60 to the open position. The nipple eventually reaches the point where the locking balls 38 enter into the retaining groove 70 of the nipple and the nipple stays locked in place. When the nipple is so locked in place, the second seal ring 54 contacts the cylindrical external surface 66 of the nipple and seals the nipple within the housing.

It will be noted that the second seal ring 54 serves the dual function of sealing the nipple to the housing when the nipple is in the housing, and also the function of sealing the cartridge 50 to the barrel 26 when the housing 10 is assembled. By the same token, the first seal ring 52 serves the dual function of providing a seal for the check valve 56 when the check valve is in the closed position, and the function of sealing the cartridge 50 to the body 14 when the housing 10 is assembled.

When it is desired to disconnect the coupling, the sleeve 40 is reciprocated toward the left as viewed in FIGURES 1 and 2 against the force of the helical spring 46. When so reciprocated, the nipple 12 may be withdrawn from the housing since the locking balls 38 are free to move radially outwardly and permit removal of the nipple.

Because of the construction of the housing 10, the seal rings 52 and 54 may be readily removed and replaced. In order to remove and replace the seal rings 52 and 54, it is necessary only to unthread the body 14 from the barrel 26. The cartridge 50 may then be removed from inside the barrel 26 and the two seal rings can be changed.

Because of the construction of body 14, barrel 26, and cartridge 50, it is not necessary to stretch the seal rings 52 and 54 in order to place them in the housing or to remove them therefrom. Accordingly, the seal rings 52 and 54 can be made of any type of material, either resilient, such as rubber, or the like, or non-resilient, such as Teflon, or the like. In addition, it will be seen that when the nipple is inserted into the housing and the coupling is in the engaged position shown in FIGURE 2, the seal rings 52 and 54 are not in the path of flow in a manner which could cause washout of the seal rings by high velocity flow.

According to the provisions of the patent statutes, I have explained the principle, preferred construction, and mode of operation of my invention, and have illustrated and described what I now consider to represent its best embodiment. However, I desire to have it understood that, within the scope of the appended claims, the invention may be practiced otherwise than as specifically illustrated and described.

I claim:

1. In a fluid-tight coupling having a check valve therein, said coupling comprising a housing adapted to receive a nipple, said housing having a check valve reciprocably mounted therein to close the flow passage of said housing when said nipple is withdrawn from said housing and to open said flow passage when said nipple is inserted into said housing to a predetermined axial position, and means associated with said housing and said nipple to releasably secure said nipple within said housing at said predetermined axial position, the improvement comprising:
 (a) the formation of said housing with:
  (1) an externally threaded, generally cylindrical body having a seal ring receiving recess formed in the annular end wall thereof;
  (2) an internally threaded barrel having at least one annular shoulder extending radially inwardly therefrom and being adapted to threadingly engage said body;
  (3) an axially rigid cylindrical cartridge having a seal ring receiving recess formed in one annular end wall thereof and a cylindrical internal surface, said cartridge adapted to be clamped axially between and forcefully contact both said body annular end wall and said barrel annular shoulder when said barrel is threaded onto said body;
  (4) a first seal ring positioned within said body seal ring receiving recess and serving the dual function of sealing said cartridge to said body and of providing a seal for said check valve when said check valve is closed;
  (5) a second seal ring positioned within said cartridge seal ring receiving recess and serving the dual function of sealing said cartridge to said barrel and of sealing said nipple to said housing when said nipple is inserted into said housing;

(b) the formation of said nipple with a cylindrical external surface adjacent the end thereof, said cylindrical external surface being contiguous to said cartridge cylindrical internal surface when said nipple is inserted into said housing and said second seal ring contacting and sealing against said nipple cylindrical external surface when said nipple is inserted into said housing.

2. The improvement of claim 1 wherein said first seal ring has a V groove therein with one leg of said V longer than the other and said long leg is positioned to extend radially inwardly toward the center of said housing and against said cartridge.

3. The improvement of claim 1 wherein said second seal ring has a V groove formed therein and the legs of said V extend axially toward said cartridge and away from said barrel annular shoulder.

4. A housing for a fluid-tight coupling, said housing having a check valve reciprocably mounted therein to close the flow passage of said housing when a nipple is withdrawn from said housing and to open said flow passage when said nipple is inserted into said housing to a predetermined axial position, said housing comprising:
   (a) an externally threaded, generally cylindrical body having a seal ring receiving recess formed in the annular end wall thereof;
   (b) an internally threaded barrel having at least one annular shoulder extending radially inwardly therefrom and being adapted to threadingly engage said body;
   (c) an axially rigid cylindrical cartridge having a seal ring receiving recess formed in one annular end wall thereof and a cylindrical internal surface, said cartridge adapted to be clamped axially between and forcefully contact both said body annular end wall and said barrel annular shoulder when said barrel is threaded onto said body;
   (d) a first seal ring positioned within said body seal ring receiving recess and serving the dual function of sealing said cartridge to said body and of providing a seal for said check valve when said check valve is closed; and
   (e) a second seal ring positioned within said cartridge seal ring receiving recess and serving the dual function of sealing said cartridge to said barrel and of sealing said nipple to said housing when said nipple is inserted into said housing.

5. The housing of claim 4 wherein said first seal ring has a V groove therein with one leg of said V longer than the other and said long leg is positioned to extend radially inwardly toward the center of said housing and against said cartridge.

6. The housing of claim 4 wherein said second seal ring has a V groove formed therein and the legs of said V extend axially toward said cartridge and away from said barrel annular shoulder.

References Cited

UNITED STATES PATENTS

| | | | |
|---|---|---|---|
| 2,135,222 | 11/1938 | Scheiwer | 251—149.6 |
| 2,265,267 | 12/1941 | Cowles | 251—149.6 |
| 2,268,020 | 12/1941 | Dahlstrom | 251—149.5 |
| 3,189,046 | 6/1965 | Callahan et al. | 251—363 |
| 3,207,524 | 9/1965 | Trbovich | 277—206 |
| 3,280,834 | 10/1966 | Zahoranec | 251—149.6 |

FOREIGN PATENTS

| | | |
|---|---|---|
| 562,840 | 7/1944 | Great Britain. |
| 272,663 | 12/1950 | Switzerland. |

M. CARY NELSON, *Primary Examiner.*

W. R. CLINE, *Assistant Examiner.*